United States Patent [19]
Didillon et al.

[11] Patent Number: 6,033,556
[45] Date of Patent: Mar. 7, 2000

[54] PROCESS AND CAPTURE MASSES FOR ELIMINATING MERCURY AND ARSENIC FROM HYDROCARBON-CONTAINING CUTS

[75] Inventors: Blaise Didillon; Slavik Kazstelan, both of Rueil Malmaison; Virgine Harle, Gouvieux, all of France

[73] Assignee: Institut Francais du Petrole, Rueil-Malmaison Cedex, France

[21] Appl. No.: 09/095,009

[22] Filed: Jun. 10, 1998

[30] Foreign Application Priority Data

Jun. 10, 1997 [FR] France ................................ 97 07151

[51] Int. Cl.⁷ .......................... C10G 25/00; C07C 7/12; B01J 20/08; B01J 20/30
[52] U.S. Cl. .......................... 208/253; 585/820; 585/852; 502/415; 502/527.16; 502/527.24; 423/210
[58] Field of Search ................. 208/253; 585/820, 585/852; 502/415, 527.16, 527.24; 423/210

[56] References Cited

FOREIGN PATENT DOCUMENTS

| | | |
|---|---|---|
| 0 015 196 | 9/1980 | European Pat. Off. . |
| 0 098 764 | 1/1984 | European Pat. Off. . |
| 0 113 284 | 7/1984 | European Pat. Off. . |
| 0 153 674 | 9/1985 | European Pat. Off. . |
| 0 353 129 | 1/1990 | European Pat. Off. . |
| 0 449 672 A1 | 10/1991 | European Pat. Off. . |

*Primary Examiner*—Bekir L. Yildirim
*Attorney, Agent, or Firm*—Millen, White, Zelano & Branigan, P.C.

[57] ABSTRACT

The present invention relates to a capture mass comprising an essentially alumina-based extruded support, and constituted by a plurality of juxtaposed agglomerates, optionally at least one oxide or a sulphide of a metal constituted by copper, molybdenum, tungsten, iron, nickel or cobalt in which the sum S of metals from the group constituted by copper, molybdenum, tungsten, iron, nickel and cobalt is in the range 0 to 70% by weight, and characterized in that each of these agglomerates is present partly in the form of packs of flakes and partly in the form of needles being uniformly dispersed both around the packs of flakes and between the flakes.

The invention also relates to its use in a fixed bed reactor to eliminate heavy metals from a hydrocarbon-containing feed.

28 Claims, No Drawings

PROCESS AND CAPTURE MASSES FOR ELIMINATING MERCURY AND ARSENIC FROM HYDROCARBON-CONTAINING CUTS

The present invention relates to an assembly of capture masses for heavy metals, in particular mercury and arsenic and optionally lead, present in hydrocarbon-containing feeds, the capture masses comprising an essentially alumina-based support in the form of extrudates, and at least one metal from the group formed by copper, molybdenum, tungsten, iron, nickel and cobalt.

The present invention also relates to processes for preparing the capture masses, also their use in capturing mercury or arsenic and possibly other heavy metals contained in hydrocarbon feeds such as petroleum cuts or hydrocarbons produced from natural gas. Such feeds can be liquid or gaseous under the conditions of use.

It is known that natural feeds such as natural gas condensates, crude oils or cuts from the distillation thereof, or natural gas can contain a certain number of heavy metals, generally in the form of organometallic compounds.

Such compounds poison the catalysts used to transform those feeds. In particular they can poison hydrotreatment, reforming or hydrogenation catalysts.

Thermal or catalytic cracking of the above feeds, for example steam cracking or catalytic cracking used to convert petroleum cuts into lighter cuts, also necessitates eliminating certain metallic compounds such as mercury or arsenic complexes. Those compounds can be transformed in such processes into more volatile compounds which then find their way into different cuts and can then poison the catalysts used to treat those cuts.

Such compounds can also engender risks to the operation of the cracking process. As an example, metallic mercury can lead to rapid corrosion of the aluminium based exchangers, and deposition of certain arsenic compounds can lead to the formation of a hot spot in the furnace tubes of a steam cracker.

The elimination of arsenic or mercury compounds from hydrocarbon cuts has been described in a number of publications. Examples are United States patents U.S. Pat. No. 4,911,825, U.S. Pat. No. 4,593,148, International patent application WO 90/10684, and European patent application EP-A-0 487 370, using solids termed an adsorbent, a capture mass, a catalyst, or a transfer mass. We shall use the term "capture mass" in the present text to designate such solids. Capture masses are generally constituted by a support based on an oxide, in particular alumina, and the active matter.

For that type of solid, good operation is highly dependent on the characteristics of the support, as described in the article by Langmuir, 1996, 12 3927–3931.

When treating a gas feed, the use of supports with unsuitable pore diameters can lead to the phenomenon of capillary condensation when the feeds are not properly dry or when they contain heavy hydrocarbons.

Further, when treating liquid feeds, the support must have a porosity profile which is adapted to the specific diffusional constraints for decontamination of the feeds (also termed elimination of heavy metals from the feeds).

The capture masses usually used for feed decontamination (dearsenification and demercurisation) processes are composed of a support on which at least one oxide or at least one sulphide of metals from the group constituted by copper, molybdenum, tungsten, iron, nickel and cobalt are deposited. When metal oxides are used, they may be sulphurated to transform all or part of the metal oxides into metal sulphide phases. The support is generally alumina-based, its role consisting of dispersing the active phase, and it must have a texture which can capture metal impurities.

There are two types of alumina-based supports which are suitable for this type of capture mass. Firstly, alumina extrudates exist which are prepared from an alumina gel. Capture masses prepared from such extrudates have a number of disadvantages. Firstly, the process for preparing the alumina gel is particularly polluting, in contrast to that of alumina originating from rapid dehydration of hydrargillite, known as flash alumina. The pores of alumina gel-based supports are not always suitable for eliminating heavy metals present in the feeds, in particular for demercurisation and dearsenification of hydrocarbon feeds. Further, considering the high production cost of the alumina gel, the manufacture of such capture masses is very expensive.

Secondly, alumina beads prepared by rapid dehydration of hydrargillite then agglomerating the flash alumina powder obtained are used as a support for capture masses containing metals. The cost of preparing these beads is lower, however in order to maintain it at a satisfactory level, beads with a diameter of more than 2 mm have to be prepared. As a result, the metals cannot be introduced right into the core of the beads, and the active elements located there are not used.

Capture masses prepared from flash alumina extrudates which are smaller and which have a porosity which is suitable for capture of mercury and arsenic compounds would not have those disadvantages, but there is currently no industrial process for preparing such capture masses.

The present invention concerns an assembly of capture masses for arsenic and mercury present in hydrocarbon feeds, processes for preparing the capture masses, and their use in treating hydrocarbon feeds, in particular for dearsenification and demercurisation, having a decontaminating power which is at least equivalent to that of capture masses which are currently known to the skilled person.

The capture masses of the invention comprise an essentially alumina-based support in the form of extrudates, optionally at least one oxide or at least one sulphide of metals from the group constituted by copper, molybdenum, tungsten, iron, nickel and cobalt, preferably copper, molybdenum, nickel or cobalt.

The extruded support used in the capture masses of the invention is generally and preferably essentially based on alumina agglomerates, the alumina agglomerates generally and preferably being obtained by forming a starting alumina originating from rapid dehydration of hydrargillite, and generally having a total pore volume of at least 0.06 $cm^3$/g, an average mesoporous diameter in the range 15 to 36 nm (manometers), and generally a quantity of alumina originating from boehmite decomposition in the range 5% to 70% by weight. The term "alumina originating from boehmite decomposition" means that during the extrudate preparation process, boehmite type alumina is produced to the point of representing 5% to 70% by weight of the total alumina, then decomposed. This quantity of alumina originating from boehmite decomposition is measured by X ray diffraction of the alumina before decomposing the boehmite.

The extruded support of the catalyst of the invention can also be obtained by extruding a mixture of varying proportions of an alumina powder from rapid dehydration of hydrargillite (flash alumina) and at least one alumina gel obtained, for example, by precipitating aluminum salts such as aluminium chloride, aluminium sulphate, aluminium nitrate, or aluminum acetate, or by hydrolysis of aluminium alkoxides such as aluminium triethoxide. Such mixtures of flash alumina and alumina gel contain less than 50% by weight of alumina gel, preferably 1% to 45% of alumina gel.

The capture masses of the invention can be prepared using any method which is known to the skilled person, more particularly using the methods described below.

The support is formed by alumina extrudates with a diameter generally in the range 0.5 to 10 mm, preferably 0.8 to 3.2 mm, when the catalyst is used in a fixed bed, the extrudates having the characteristics described above. Any known method can be used for the optional introduction of the active elements, at any stage of the preparation, preferably by impregnation or co-mixing, onto the extrudates or prior to their forming by extrusion, the active elements being at least one compound of a metal from the group constituted by copper, molybdenum, tungsten, iron, nickel and cobalt. The compounds can optionally be mixed with the support by co-mixing at any step of the support forming process. When there are a plurality, at least part of the compounds can optionally be introduced separately or simultaneously during impregnation or co-mixing with the support, at any stage of forming or preparation.

As an example, the catalyst of the invention can be prepared using a preparation process comprising the following steps:

a) co-mixing alumina powder originating from rapid dehydration of hydrargillite with at least one compound of a catalytic metal from the group constituted by copper, molybdenum, tungsten, iron, nickel and cobalt, optionally followed by ageing, and/or drying, then optional calcining;

b) forming by extruding the product obtained from step a).

The metals cited above are usually introduced into the capture mass in the form of compounds such as oxides, acids, salts, or organic complexes. The sum S of the metals from the group formed by copper, molybdenum, tungsten, iron, nickel and cobalt, expressed as the oxides introduced into the capture masses, is in the range 0 to 70% by weight, preferably 1% to 60% by weight, more preferably 1% to 40% by weight.

The preparation then generally comprises ageing and drying, then generally a heat treatment, for example calcining, at a temperature in the range 400° C. to 800° C., and/or optional sulphuration, for example using ammonium sulphide, to obtain the desired oxide or sulphide.

The support, the use of which is one of the essential elements of the invention, is essentially alumina-based. The support used in the capture masses of the invention is generally and preferably obtained by forming a starting alumina originating from rapid dehydration of hydrargillite, forming preferably being carried out using one of the processes described below.

Processes for preparing the support of the invention are described below for a support constituted by alumina. When the support contains one or more other compounds, the compound or compounds or a precursor of the compound or compounds may be introduced at any stage in the process for preparing the support of the invention. It is also possible to introduce the compound or compounds by impregnating the formed alumina using the compound or compounds or any precursor of the compound or compounds.

A first process for forming a starting alumina originating from rapid dehydration of hydrargillite comprises the following steps:

$a_1$ starting from an alumina originating from rapid dehydration of hydrargillite;

$b_1$ rehydrating the starting alumina;

$c_1$ mixing the rehydrated alumina in the presence of an emulsion of at least one hydrocarbon in water;

$d_1$ extruding the alumina-based paste obtained from step $c_1$;

$e_1$ drying and calcining the extrudates from step $d_1$;

$f_1$ carrying out a hydrothermal acid treatment in a confined atmosphere on the extrudates from step $e_1$;

$g_1$ drying and calcining the extrudates from step $f_1$.

A second process for forming the alumina from a starting alumina originating from rapid dehydration of hydrargillite comprises the following steps:

$a_2$ starting from an alumina originating from rapid dehydration of hydrargillite;

$b_2$ forming the alumina into beads in the presence of a pore-forming agent;

$c_2$ ageing the alumina beads obtained;

$d_2$ mixing the beads from step $c_2$ to obtain a paste which is extruded;

$e_2$ drying and calcining the extrudates from step $d_2$;

$f_2$ carrying out a hydrothermal acid treatment in a confined atmosphere on the extrudates obtained from step $e_2$;

$g_2$ drying and calcining the extrudates from step $f_2$.

A third process for forming an alumina from a starting alumina originating from rapid dehydration of hydrargillite comprises the following steps:

$a_3$ starting from an alumina originating from rapid dehydration of hydrargillite;

$b_3$ rehydrating the starting alumina;

$c_3$ mixing the rehydrated alumina with a pseudo-boehmite gel, the gel being present in an amount in the range 1% to 30% by weight with respect to the rehydrated alumina and the gel;

$d_3$ extruding the alumina-based paste obtained from step $c_3$;

$e_3$ drying and calcining the extrudates from step $d_3$;

$f_3$ carrying out a hydrothermal acid treatment in a confined atmosphere on the extrudates obtained from step $e_3$;

$g_3$ optionally drying then calcining the extrudates from step $f_3$.

This process uses identical steps to steps $a_1$, $b_1$, $d_1$, $e_1$, $f_1$ and $g_1$ of the first process described above.

The alumina extrudates of the invention generally and preferably have a total pore volume (TPV) of at least 0.6 cm³/g, preferably at least 0.65 cm³/g.

The TPV is measured as follows: the grain density and absolute density are determined; the grain densities (Dg) and absolute densities (Da) are measured $$VPT = \frac{1}{Dg} - \frac{1}{Da}.$$

The average mesoporous diameter of the extrudates of the invention is also generally and preferably in the range 15 to 36 nm (nanometers). The average mesoporous diameter for the given extrudates is measured using a graph of the pore distribution of said extrudates. It is the diameter for which the associated volume V on the graph is:

$$V_{100nm} + \frac{V_{6nm} - V_{100nm}}{2}$$

where $V_{100nm}$ represents the volume created by pores with a diameter of over 100 nm (macropores), or the macroporous volume;

$V_{6nm}$ represents the volume created by pores with a diameter of over 6 nm;

$V_{6nm}-V_{100nm}$ represents the mesoporous volume, i.e., the volume created by pores with a diameter in the range 6 nm and 100 nm, i.e., the volume created by all the pores with a size in the range 6 nm to 100 nm (mesopores).

These volumes are measured using a mercury penetration technique in which the Kelvin law is applied which defines the relationship between the pressure, the diameter of the smallest pore into which the diameter penetrates at that pressure, the wetting angle and the surface tension in the following formula:

$$\emptyset = (4t\cos 0).10/P$$

where $\emptyset$ represents the pore diameter (in nm);

t represents the surface tension (48.5 Pa);

0 represents the angle of contact ($\theta = 140°$); and

P represents the pressure (MPa).

The extrudates of the invention preferably have a mesoporous volume ($V_{6nm}-V_{100nm}$) of at least 0.3 cm$^3$/g, more preferably at least 0.5 cm$^3$/g.

The extrudates of the invention preferably have a macroporous volume $V_{100nm}$ of at most 0.5 cm$^3$/g. In a variation, the macroporous volume ($V_{100nm}$) is at most 0.3 cm$^3$/g, more preferably at most 0.1 cm$^3$/g and still more preferably at most 0.08 cm$^3$/g.

These extrudates normally have a microporous volume $V_{0-6nm}$ of at most 0.55 cm$^3$/g, preferably at most 0.2 cm$^3$/g. The microporous volume represents the volume created by pores with a diameter of less than 6 nm.

Such a pore distribution, which minimises the proportion of pores of less than 6 nm and those of more than 100 nm while increasing the proportion of mesopores (with a diameter in the range 6 nm and 100 nm) is particularly adapted to the diffusional constraints of capture masses for heavy metals.

In a preferred variation, the pore distribution over the pore diameter range from 6 nm to 100 nm (mesopores) is extremely narrow at around 15 nm, i.e., in this range the diameter of the majority of pores is in the range 6 nm to 50 nm, preferably in the range 8 nm to 20 nm.

The specific surface area (SSA) of the extrudates of the invention is generally at least 120 m$^2$/g, preferably at least 150 m$^2$/g. This surface area is a BET surface area. The term "BET surface area" means the specific surface area determined by nitrogen adsorption in accordance with the standard ASTM D 3663-78 established using the BRUNAUER-EMMETT-TELLER method described in "The Journal of the American Society" 60, 309 (1938).

Preferably, the diameter of the extrudates of the invention is in the range 0.5 to 10 mm, preferably in the range 0.8 to 3.2 mm, and the length is in the range 1 mm to 20 mm, preferably in the range 1 to 10 mm, in particular when the catalyst is used in a fixed bed.

To average crushing strength (ACS) of these extrudates is generally at least 0.68 daN/mm for 1.6 mm extrudates, preferably at least 1 mm, and the crush strength (CS) is at least 1 MPa.

The method of measuring the average crushing strength (ACS) consists of measuring the type of maximum compression which an extrudate can support before it fails, when the product is placed between two planes being displaced at a constant speed of 5 cm/min.

Compression is applied perpendicular to one of the extrudate generatrices, and the average crushing strength is expressed as the ratio of the force to the length of the generatrix of the extrudate.

The method used to measure the crush strength (CS) consists of subjecting a certain quantity of extrudates to an increasing pressure over a sieve and recovering the fines resulting from crushing the extrudates. The crush strength corresponds to the force exerted to obtain fines representing 0.5% of the weight of the extrudates under test.

The alumina of the invention is essentially constituted by a plurality of juxtaposed agglomerates, each of these agglomerates generally and preferably being partially in the form of packs of flakes and partially in the form of needles, the needles being uniformly dispersed both around the packs of flakes and between the flakes.

In general, the length and breadth of the flakes varies between 1 to 5 $\mu$m with a thickness of the order of 10 nm. They can be packed in groups forming a thickness of the order of 0.1 to 0.5 $\mu$m, the groups possibly being separated from each other by a thickness of the order of 0.05 to 0.1 $\mu$m.

The needle length can be in the range 0.05 to 0.5 $\mu$m; their cross section is of the order of 10 to 20 nm. These dimensions are given by measuring the extrudates in electron microscope photographs. The alumina flakes principally comprise $\chi$ alumina and $\eta$ alumina and the needles are $\gamma$ alumina.

The flake structure is characteristic of the hydrargillite lineage of alumina, which means that before activation by calcining, these extrudates have the same structure, the flakes being hydrargillite in nature. On calcining, this alumina in its hydrargillite form is principally transformed into dehydrated $\chi$ and $\eta$ aluminas.

In contrast, the needle structure is characteristic of a boehmite lineage, meaning that before activation by calcining, these extrudates have the same structure, this alumina being in the form of boehmite. Calcining transforms this boehmite alumina into dehydrated $\gamma$ alumina.

The extrudates of the invention are thus obtained by calcining, the extrudates being constituted by hydrargillite alumina-based flakes prior to calcining, the flakes being surrounded at their periphery by boehmite alumina-based needles.

The forming process of the invention is more particularly suitable for a starting alumina originating from rapid dehydration of Bayer hydrate (hydrargillite) which is an industrially available aluminium hydroxide and extremely cheap.

Such an alumina is in particular obtained by rapid dehydration of hydrargillite using a hot gas stream, the temperature of the gas entering the apparatus generally being between about 400° C. to 1200° C., the contact time between the alumina and the hot gases generally being in the range from a fraction of a second to 4–5 seconds; such a process for preparing an alumina powder has been described in French patent FR-A1-1 108 011.

The alumina obtained can be used as it is or before undergoing step $b_1$, it can be treated to eliminate the alkalis present; a Na$_2$O content of less than 0.5% by weight is preferable.

The starting alumina is preferably re-hydrated during step $b_1$ so that the boehmite type alumina content is at least 3% by weight, preferably at most 40% by weight.

The various steps of these processes for preparing alumina extrudates are described in more detail in a patent application entitled "Alumina extrudates, processes for their preparation and their use as catalysts or catalyst supports" by Rhône-Poulene Chimie.

The capture masses of the invention can thus be used in all processes for eliminating heavy metals (decontamination) from a feed, in particular for demercurisation and dearsenification of hydrocarbon feeds such as petroleum cuts or hydrocarbons produced from natural gas.

The elimination of heavy metals, in particular mercury and arsenic, can be achieved using one or more reactors containing one or more capture masses disposed in a fixed bed. In one fixed bed process treating liquid feeds, treatment intended to eliminate impurities such as mercury and/or arsenic compounds are normally carried out at a temperature of about 20° C. to about 450° C. In some cases hydrogen can be injected to increase the efficiency of capture of the mercury or arsenic compounds. The space velocity is generally in the range about 1 to about 50 volumes of feed per volume of capture mass per hour, preferably 1 to 30 volume per volume of capture mass per hour. Under these conditions and for all types of capture masses of the invention, it is also possible to carry out hydrotreatment reactions such as hydrodesulphuration, denitrogenation or hydrogenation.

In a fixed bed process treating gas feeds, treatments intended to eliminate impurities such as mercury and/or arsenic compounds are normally carried out at a temperature of about −50° C. to about 200° C. with a HSV (volume of gas feed per volume of capture mass per hour) in the range 500 to 5000 $h^{-1}$.

The following examples illustrate the invention without limiting its scope.

EXAMPLE 1

Preparation of alumina support A forming part of the composition of capture masses A1 and A2 of the invention Step $a_1$—starting alumina: The starting material was alumina obtained by very rapid decomposition of hydrargillite in a hot air stream (T=1000° C.). The product obtained was constituted by a mixture of transition aluminas: (khi) and (rho) aluminas. The specific surface area of the product was 300 $m^2/g$ and the loss on ignition (LOI) was 5%.

Step $b_1$—rehydration: The alumina was rehydrated by taking it into suspension in water at a concentration of 500 g/l at a temperature of 90° C. for a period of 48 h in the presence of 0.5% citric acid.

After filtering the suspension, a cake of alumina was recovered which was washed with water then dried at a temperature of 140° C. for 24 h.

The alumina obtained was in the form of a powder, its loss on ignition (LOI), measured by calcining at 1000° C., and its amount of alumina in the form of boehmite, measured by X ray diffraction, are shown in Table 1.

Step $c_1$—mixing: 10 kg of rehydrated and dried powder was introduced into a 25 liter volume Z blade mixer and an emulsion of hydrocarbon in water stabilised by a surfactant, obtained using a stirred reactor, and 69% nitric acid, was gradually added. The characteristics are shown in Table 1.

Mixing was maintained until a consistent homogeneous paste was obtained. After mixing, a 20% ammonia solution was added to neutralise the excess nitric acid, continuing mixing for 3 to 5 min.

Step $d_1$—extrusion: The paste obtained was introduced into a single screw extruder to obtain raw extrudates with a diameter of 1.6 mm.

Step $e_1$—drying/calcining: The extrudates were then dried at 140° C. for 15 h and calcined for 12 h at a temperature of 680° C. The calcined support had a specific surface area of 148 $m^2/g$.

Step $f_1$—hydrothermal treatment: The extrudates obtained were impregnated with a solution of nitric and acetic acid in the following concentrations: 3.5% of nitric acid with respect to the weight of alumina and 6.5% of acetic acid with respect to the weight of alumina. They then underwent hydrothermal treatment in a rotating basket autoclave under the conditions defined in Table 1.

Step $g_1$—drying/calcining: At the end of this treatment, the extrudates were calcined at a temperature of 550° C. for 2 h. The amount of boehmite shown in Table 1 was measured for the extrudates prior to final calcining.

The characteristics of the extruded alumina support A obtained are shown in Table 1.

EXAMPLE 2

Preparation of capture mass A1 (in accordance with the invention)

We dry impregnated the extruded support A of Example 1 with an aqueous solution containing nickel nitrate $Ni(NO_3)_2.6H_2O$.

The impregnated extrudates were dried overnight at 120° C. then calcined at 550° C. for 2 hours in air. The final nickel content Ni was 20% by weight.

EXAMPLE 3

Preparation of capture mass A2 (in accordance with the invention)

We dry impregnated the extruded support A of Example 1 with an aqueous solution containing copper nitrate $Cu(NO_3)_2.3H_2O$.

The impregnated extrudates were dried overnight at 120° C. then calcined at 550° C. for 2 hours in air. The final copper content was 10% by weight.

The capture mass was then sulphurated by impregnating with an aqueous 20% ammonium sulphide solution. The excess sulphur was eliminated by oven drying at 200° C. for 10 hours in a stream of nitrogen.

EXAMPLE 4

Preparation of alumina support B forming part of the composition of capture masses B1 and B2 (in accordance with the invention)

The same steps of Example 1 were used except that mixing step $c_1$ was carried out as follows.

Step $c_1$—mixing: This was a continuous process carried out in a co-rotating twin screw mixer.

Upstream of the mixer, the rehydrated and dried alumina was introduced at a rate of 90 kg/h. An emulsion of petroleum in water was prepared in a stirred reactor, by introducing:

5.46 kg of water;

10.04 kg of 69% nitric acid;

10.4 kg of petroleum;

1.56 kg of Soprophor SC138.

This emulsion was introduced into the sheath of the twin screw machine at a rate of 27.46 kg/h immediately following introduction of the alumina powder.

After machining, a 28% ammonia solution was introduced at a rate of 4.34 kg/h. The passage time for the powder in the machine was of the order of 50 to 60 s. A homogeneous paste which could be extruded was obtained from the machine outlet.

The boehmite content was measured for the extrudates prior to final calcining.

The extruded alumina support B obtained had the characteristics shown in Table 1.

TABLE 1

|  | Alumina A | Alumina B |
|---|---|---|
| Rehydrated alumina - end of step b1 | | |
| % boehmite | 24 | 33 |
| LOI (1000° C.) | 25 | 23 |
| Mixing - step c1 | | |
| Hydrocarbon type | petroleum | petroleum |
| % HNO3/Al2O3* | 10 | 10 |
| % hydrocarbon/Al2O3* | 15 | 15 |
| water/hydrocarbon | 3.7 | 2.6 |
| Surfactant type | Galoryl EM 10 | Soprophor SC138 |
| % surfactant/hydrocarbon | 17 | 15 |
| Time (h) | 2.15 | |
| % neutralisation with respect to HNO3, equivalents | 65 | 65 |
| Drying/calcining - step e1 | | |
| Calcining temperature (° C.) | 680 | 600 |
| Specific surface area (m²/g) | 148 | 177 |
| Hydrothermal treatment - step f1 | | |
| Temperature (° C.) | 212 | 202 |
| Pressure (MPa) | 19 | 16 |
| Time (h) | 2 | 2 |
| % boehmite | 40 | 43 |
| Characteristics of calcined extrudates obtained | | |
| TPV (cm³/g) | 0.80 | 0.66 |
| $V_{6\,mm}-V_{100\,mm}$ (cm³/g) | 0.60 | 0.66 |
| $V_{100\,mm}$ (cm³/g) | 0.19 | <0.02 |
| av. mesopore diameter (nm) | 28 | 24.5 |
| $V_{0-6\,mm}$ (cm³/g) | 0.02 | 0.01 |
| Specific surface area (m²/g) | 140 | 152 |
| ACS (dnN/mm) | 1.2 | 1.1 |
| CS (MPa) | 1.58 | 1.58 |

EXAMPLE 5

Preparation of capture mass B1 (in accordance with the invention)

We dry impregnated the extruded support B of Example 4 with an aqueous solution containing nickel nitrate $Ni(NO_3)_2 \cdot 6H_2O$. The impregnated extrudates were dried overnight at 120° C. then calcined at 550° C. for 2 hours in air. The final nickel content Ni was 20% by weight.

EXAMPLE 6

Preparation of capture mass B2 (in accordance with the invention)

We dry impregnated the extruded support B of Example 4 with an aqueous solution containing copper nitrate $Cu(NO_3)_2 \cdot 3H_2O$.

The impregnated extrudates were dried overnight at 120° C. then calcined at 550° C. for 2 hours in air. The final copper content was 10% by weight.

The capture mass was then sulphurated by impregnating with an aqueous 20% ammonium sulphide solution. The excess sulphur was eliminated by oven drying at 200° C. for 10 hours in a stream of nitrogen.

EXAMPLE 7

Preparation of alumina support C forming part of the composition of capture masses C1 and C2 of the invention.

Step $a_2$—starting alumina: The alumina of Example 1 was used.

Step $b_2$—bead formation: The alumina was mixed with wood dust as a pore-forming agent (20% by weight with respect to the alumina), then formed in a rotating bowl granulator. Water was added to aid forming. The diameter of the alumina beads obtained was in the range 1.5 to 4 mm.

Step $c_2$—ageing of beads: These beads were aged by passing steam, the bead temperature being 90° C. for 20 h. The loss on ignition of the beads obtained was 47.5% and they contained 25% by weight of boehmite.

Step $d_2$—mixing/extrusion: The mixing process used was a continuous process carried out in a corotating twin screw mixer.

Upstream of the mixer, alumina beads were introduced at a rate of 90 kg/h. A solution of 2.42% nitric acid was introduced into the sheath immediately following introduction of the aged beads at a rate of 10.9 kg/h.

At the end of machining, a 2.1% ammonia solution was introduced at a rate of 4.2%. The passage time in the machine was of the order of 50 s.

A homogeneous alumina powder which could be extruded was obtained from the mixer outlet.

The paste obtained was extruded through a die with 1.6 mm diameter orifices.

Step $e_2$—drying/calcining: The extrudates were then dried at 140° C. for 2 h and calcined for 2 h at the calcining temperature shown in Table 3. The specific surface area of the calcined extrudates was between 120 and 200 m²/g.

Step $f_2$—hydrothermal treatment: The extrudates obtained were impregnated with a solution of nitric and acetic acid in the following concentrations: 3.5% of nitric acid with respect to the weight of alumina and 6.5% of acetic acid with respect to the weight of alumina. They then underwent hydrothermal treatment in a rotating basket autoclave under the conditions defined in Table 2.

Step $g_2$—drying/calcining: At the end of this treatment, the extrudates were calcined at a temperature of 550° C. for 2 h.

The amount of boehmite was measured for the extrudates prior to final calcining. The characteristics of the extruded alumina support C obtained are shown in Table 2.

|  | Alumina C |
|---|---|
| Drying/calcining - step c2 | |
| Calcining temperature (° C.) | 700 |
| Specific surface area (m²/g) | 140 |
| Hydrothermal treatment - step f2 | |
| Temperature (° C.) | 204 |
| Pressure (MPa) | 16 |
| Time (h) | 2 |
| % boehmite | 30 |
| Characteristics of calcined extrudates obtained | |
| TPV (cm³/g) | 0.81 |
| $V_{6\,mm}-V_{100\,mm}$ (cm³/g) | 0.66 |
| $V_{100\,mm}$ (cm³/g) | 0.15 |
| av. mesopore diameter (nm) | 25 |
| $V_{0-6\,mm}$ (cm³/g) | 0 |
| Specific surface area (m²/g) | 141 |
| ACS (daN/mm) | 0.90 |
| CS (MPa) | 1.24 |

EXAMPLE 8

Preparation of capture mass C1 (in accordance with the invention)

We dry impregnated the extruded support C of Example 5 with an aqueous solution containing nickel nitrate $Ni(NO_3)_2 \cdot 6H_2O$.

The impregnated extrudates were dried overnight at 120° C. then calcined at 550° C. for 2 hours in air. The final nickel content Ni was 20% by weight.

EXAMPLE 9
Preparation of capture mass C2 (in accordance with the invention)

We dry impregnated the extruded support C of Example 5 with an aqueous solution containing copper nitrate $Cu(NO_3)_2.3H_2O$.

The impregnated extrudates were dried overnight at 120° C. then calcined at 550° C. for 2 hours in air. The final copper content was 10% by weight.

The capture mass was then sulphurated by impregnating with an aqueous 20% ammonium sulphide solution. The excess sulphur was eliminated by oven drying at 200° C. for 10 hours in a stream of nitrogen.

EXAMPLE 10
Preparation of support D forming part of the composition of capture masses D1 and D2 (comparative)

A macroporous support in the form of beads was prepared using the following procedure:

The same starting alumina as that used in Example 1 was suspended in deionized water to obtain a viscous slurry containing 60 g/l of $Al_2O_3$ which was spray dried. The temperature of the inlet air was 200° C., that of the outlet air was 110° C. The gel recovered was in the form of 10 to 20 μm diameter beads with a loss on ignition of 35%. This powder was agglomerated in a rotating bowl granulator using a molar ammonia solution as the liquid. The beads obtained, aged in a confined atmosphere for 24 hours at 80° C., were calcined for 2 hours at 700° C.

4 kg of the above beads were treated in the vapour phase at 195° C. for 3 hours in an autoclave. The treatment medium was constituted by a mixture of nitric acid in a concentration of 7 g per 100 g of $Al_2O_3$ and acetic acid in a concentration of 10 g per 100 g of $Al_2O_3$. The treated beads were heated activated at 900° C. for 2 hours in a furnace. Beads with a granulometry of 1.2 to 2.8 mm diameter were selected and constituted support D.

EXAMPLE 10
Preparation of capture mass D1 (comparative)

Support D from Example 7 was dry impregnated with an aqueous solution containing nickel nitrate $Ni(NO_3)_2.6H_2O$. The impregnated beads were dried overnight at 120° C. then calcined at 550° C. for 2 hours in air. The nickel content Ni was 20% by weight.

The characteristics of the capture mass beads D1 obtained are shown in Table 3.

|  | Capture mass D1 |
| --- | --- |
| Characteristics of bonds |  |
| TPV (cm³/g) | 0.97 |
| $V_{6\,mm}-V_{100\,mm}$ (cm³/g) | 0.66 |
| $V_{100\,mm}$ (cm³/g) | 0.31 |
| av. mesopore diameter (nm) | 25 |
| $V_{0-6\,mm}$ (cm³/g) | 0 |
| Specific surface area (m²/g) | 119 |
| CS (MPa) | 1.48 |

EXAMPLE 12
Preparation of capture mass D2 (in accordance with the invention)

We dry impregnated the extruded support D of Example 7 with an aqueous solution containing copper nitrate $Cu(NO_3)_2.3H_2O$.

The impregnated extrudates were dried overnight at 120° C. then calcined at 550° C. for 2 hours in air. The final copper content was 10% by weight.

The capture mass was then sulphurated by impregnating with an aqueous 20% ammonium sulphide solution. The excess sulphur was eliminated by oven drying at 200° C. for 10 hours in a stream of nitrogen.

EXAMPLE 13
Mercury and arsenic elimination tests using capture masses A, B, C and D Capture masses A1, A2, B1, B2, C1, C2, D1 and D2 described above were compared for capturing mercury and arsenic present in a natural gas condensate.

The tests were carried out in a pilot unit comprising two fixed bed tube reactors. The first reactor was filled with one liter of capture mass X1 (A1 and B1 or C1 or D1) and the second with 1 liter of capture mass X2 (A2 or B2 or C2 or D2). The fluid flow was an upflow.

The capture mass located in the first reactor was reduced under the following conditions:

Pressure: 0.2 MPa;

Hydrogen flow rate: 400 l/h;

Temperature: 400° C.;

Duration: 8 hours.

After reduction of the first capture mass, the two reactors were connected in series. A natural gas condensate containing 50 ppb of mercury and 30 ppb of arsenic was passed over the two reactors in succession. The operating conditions were as follows:

|  | First reactor | Second reactor |
| --- | --- | --- |
| Temperature (° C.) | 180 | 20 |
| Feed flow rate l/h | 10 | 10 |
| Hydrogen flow rate l/h | 80 | 80 |
| Pressure (MPa) | 3 | 30 |

The condensate was passed for a period of 400 hours. After drying, the capture masses were dried and discharged layer by layer into five layers. The mercury and arsenic contents of the two capture masses were then determined. The results obtained are shown in Table 2.

| Bed no | Amount of As on mass in first reactor (ppm) | | | | Amount of As on mass in second reactor (ppm) | | | |
| --- | --- | --- | --- | --- | --- | --- | --- | --- |
| Example | A1 | B1 | C1 | D1 | A2 | B2 | C2 | D2 |
| 1 | 4600 | 2500 | 4900 | 4300 | 8350 | 4200 | 8150 | 7900 |
| 2 | 1200 | 1500 | 1150 | 1300 | 1150 | 1800 | 1300 | 1400 |
| 3 | 100 | 1000 | 50 | 250 | 500 | 1200 | 350 | 500 |
| 4 | <30 | 500 | <30 | 150 | <20 | 800 | 150 | 200 |
| 5 | <30 | 400 | <30 | <30 | <20 | 200 | <20 | <20 |

The preceding examples can be repeated with similar success by substituting the generically or specifically described reactants and/or operating conditions of this invention for those used in the preceding examples.

The entire disclosure of all applications, patents and publications, cited above and below, and of corresponding French application No. 97/07151, filed Jun. 10, 1997, is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

We claim:

1. A capture mass comprising an essentially alumina-based extruded support, essentially constituted by a plurality of juxtaposed agglomerates, and optionally at least one oxide or sulphide of a metal from the group constituted by copper, molybdenum, tungsten, iron, nickel and cobalt, in which the sum S of the metals from the group constituted by copper, molybdenum, tungsten, iron, nickel and cobalt is in the range 0% to 70% by weight, and characterized in that each of these agglomerates is partly in the form of packs of flakes and partly in the form of needles, said needles being uniformly dispersed both about the packs of flakes and between the flakes.

2. A capture mass according to claim 1, containing no metals (S=0% by weight).

3. A capture mass according to claim 1, in which the sum S is in the range 1% to 60% by weight.

4. A capture mass according to claim 1, in which the alumina agglomerates are obtained by forming a starting alumina originating from rapid dehydration of hydrargillite, and in which the amount of alumina from boehmite decomposition is in the range 5% to 70% by weight.

5. A capture mass according to claim 1, in which the total pore volume is at least 0.6 $cm^3/g$, and the average diameter of the mesopores is in the range 15 to 36 nm.

6. A capture mass 1 according to claim 1, in which the mesoporous volume $V_{6nm}-V_{100nm}$ is at least 0.3 $cm^3/g$, the macroporous volume $V_{100nm}$ is at most 0.5 $cm^3/g$ and the microporous volume $V_{0-6nm}$ is at most 0.55 $cm^3/g$.

7. A capture mass according to claim 1, in which the metal oxide or sulphide is an oxide or sulphide of copper, molybdenum, tungsten, iron, nickel or cobalt.

8. A capture mass according to claim 1, in which the metal oxide or sulphide is an oxide or sulphide of copper, molybdenum, nickel or cobalt.

9. A capture mass according to claim 1, in which the diameter of the alumina extrudates is in the range 0.5 to 10 mm.

10. A process for preparing a catalyst according to claim 1, characterized in that it comprises the following steps:

a) forming an essentially alumina-based support to obtain extrudates;

b) impregnating the extrudates with a solution comprising at least one compound of a catalytic metal from the group constituted by copper, molybdenum, tungsten, iron, nickel and cobalt optionally followed by ageing, and/or drying, then followed by calcining and/or optionally by sulphuration.

11. A process for preparing a capture mass according to claim 1, characterized in that it comprises the following steps:

a) co-mixing the alumina powder originating from rapid dehydration of hydrargillite with at least one compound of a catalytic metal selected from the group constituted by copper, molybdenum, tungsten, iron, nickel and cobalt, optionally followed by ageing and/or drying, then optional calcining and/or sulfuration;

b) forming by extruding the product obtained from step a).

12. A process for preparing a capture mass according to claim 10, characterized in that the process for forming the starting alumina comprises the following steps:

$a_1$ starting from an alumina originating from rapid dehydration of hydrargillite;

$b_1$ rehydrating the starting alumina;

$c_1$ mixing the rehydrated alumina in the presence of an emulsion of at least one hydrocarbon in water;

$d_1$ extruding the alumina-based paste obtained from step $c_1$;

$e_1$ drying and calcining the extrudates from step $d_1$;

$f_1$ carrying out a hydrothermal acid treatment in a confined atmosphere on the extrudates from step $e_1$;

$g_1$ drying and calcining the extrudates from step $f_1$.

13. A process for preparing a capture mass according to claim 10, characterized in that the process for forming the starting alumina comprises the following steps:

$a_2$ starting from an alumina originating from rapid dehydration of hydrargillite;

$b_2$ forming the alumina into beads in the presence of a pore-forming agent;

$c_2$ ageing the alumina beads obtained;

$d_2$ mixing the beads from step $c_2$ to obtain a paste which is extruded;

$e_2$ drying and calcining the extrudates from step $d_2$;

$f_2$ carrying out a hydrothermal acid treatment in a confined atmosphere on the extrudates obtained from step $e_2$;

$g_2$ drying and calcining the extrudates from step $f_2$.

14. A process for preparing a capture mass according to claim 10, characterized in that the process for forming the starting alumina comprises the following steps:

$a_3$ starting from an alumina originating from rapid dehydration of hydrargillite;

$b_3$ rehydrating the starting alumina;

$c_3$ mixing the rehydrated alumina with a pseudo-boehmite gel, said gel being present in an amount in the range 1% to 30% by weight with respect to the rehydrated alumina and the gel;

$d_3$ extruding the alumina-based paste obtained from step $c_3$;

$e_3$ drying and calcining the extrudates from step $d_3$;

$f_3$ carrying out a hydrothermal acid treatment in a confined atmosphere on the extrudates obtained from step $e_3$;

$g_3$ optionally drying, then calcining the extrudates from step $f_3$.

15. In a process for eliminating heavy metals from a hydrocarbon feed with a capture mass, the improvement wherein the capture mass is that of claim 1.

16. A process according to claim 15, in which the hydrocarbon feed includes mercury and/or arsenic.

17. A process according to claim 16, in which the process for eliminating heavy metals from liquid feeds is carried out in a fixed bed at a temperature of 20° C. to about 450° C., at a space velocity of about 1 to about 50 volumes of feed per volume of capture mass per hour.

18. A process according to claim 16 in which the process for eliminating heavy metals from gas feeds is carried out in a fixed bed at a temperature of −50° C. to about 200° C. at a space velocity of about 500 to about 5000 volumes of feed per volume of capture mass per hour.

19. A capture mass produced by the process of claim 10.

20. A capture mass produced by the process of claim 11.

21. A capture mass produced by the process of claim 12.

22. A capture mass produced by the process of claim 13.

23. A capture mass produced by the process of claim 14.

24. A capture mass according to claim 4, wherein the total pore volume is a least 0.6 $cm^3/g$, and the average diameter of the mesopores is in the range 15 to 36 nm, the mesoporous volume $V_{6nm}-V_{100nm}$ is at least 0.3 $cm^3/g$, the macroporous volume $V_{100nm}$ is at most 0.5 $cm^3/g$ and the microporous volume $V_{0-6nm}$ is at most 0.55 $cm^3/g$, and wherein the metal oxide or sulphide is an oxide or sulphide of copper, molybdenum, tungsten, iron, nickel or cobalt.

25. A process according to claim 15, said capture mass containing no metals (S=0% by weight).

26. A process according to claim 15, wherein referring to the capture mass, the total pore volume is at least 0.6 cm$^3$/g, and the average diameter of the mesopores is in the range 15 to 36 nm.

27. A process according to claim 15, wherein referring the the capture mass, the mesoporous volume $V_{6nm}-V_{100nm}$ is at least 0.3 cm$^3$/g, the macroporous volume $V_{100nm}$ is at most 0.5 cm$^3$/g and the microporous volume $V_{0-6nm}$ is at most 0.55 cm$^3$/g.

28. A process according to claim 15, wherein referring to the capture mass, the metal oxide or sulphide is an oxide or sulphide of copper, molybdenum, tungsten, iron, nickel or cobalt.

* * * * *